United States Patent [19]

Hendry

[11] Patent Number: 5,344,596
[45] Date of Patent: Sep. 6, 1994

[54] METHOD FOR FLUID COMPRESSION OF INJECTION MOLDED PLASTIC MATERIAL

[75] Inventor: James W. Hendry, Brooksville, Fla.

[73] Assignee: ICP Systems, Inc., Madison Heights, Mich.

[21] Appl. No.: 961,615

[22] Filed: Oct. 15, 1992

Related U.S. Application Data

[63] Continuation-in-part of Ser. No. 855,236, Mar. 23, 1992, abandoned.

[51] Int. Cl.⁵ ............................................. B29C 45/34
[52] U.S. Cl. ................................. 264/40.3; 425/437; 425/556; 425/155; 264/500
[58] Field of Search ............... 264/500, 572, 537, 335, 264/40.3; 249/66.1, 82; 425/577, 437, 556, 155

[56] References Cited

U.S. PATENT DOCUMENTS

| | | | |
|---|---|---|---|
| 3,345,687 | 10/1967 | Marx | 425/576 |
| 3,906,066 | 9/1975 | Barrie | 264/45.5 |
| 4,096,218 | 6/1978 | Yasuike | 264/45.5 |
| 4,101,617 | 7/1978 | Friedrich | 264/93 |
| 4,129,635 | 12/1978 | Yasuike | 264/45.5 |
| 4,389,358 | 6/1983 | Hendry | 264/45.1 |
| 4,519,763 | 5/1985 | Matsuda | 425/192 R |
| 4,531,703 | 7/1985 | Underwood | 249/66 A |
| 4,948,547 | 8/1990 | Hendry | 264/500 |
| 5,118,455 | 6/1992 | Loren | 264/572 |

FOREIGN PATENT DOCUMENTS 9006220 6/1990 PCT Int'l Appl. .

*Primary Examiner*—Catherine Timm
*Attorney, Agent, or Firm*—Harness, Dickey & Pierce

[57] ABSTRACT

A mold apparatus and method is used to form a solid injection molded plastic part having no internal voids, a Class A finish, a sink-free exterior appearance surface, and unevenly distributed structural detail extending from the opposite surface, the detail including free-standing reinforcement ribs, attachment bosses, and the like. In the method the mold portions of the mold apparatus are closed, charges of molten thermoplastic and pressurized gas are sequentially injected into a mold cavity defining the shape of the desired part, and the mold portions are sequentially separated and closed. The pressurized gas forces the hot plastic away from one mold half and against the other mold half, and separation of the mold portions ensures uniform distribution of the pressurized gas behind the hot plastic, which pressure is maintained during cooling. Depending on the application, the plastic completely packs the cavity, fills but does not pack the cavity, and the mating faces can be abutted or maintained partially separated when the mold portions reclosed. A gas seal is formed by the plastic to prevent gas in the mold cavity from reaching the finished exterior surface of the part during shrinkage of the plastic.

37 Claims, 7 Drawing Sheets

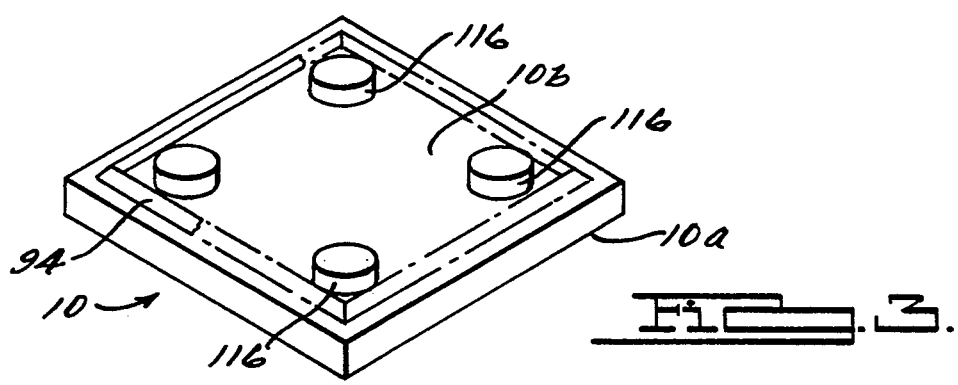
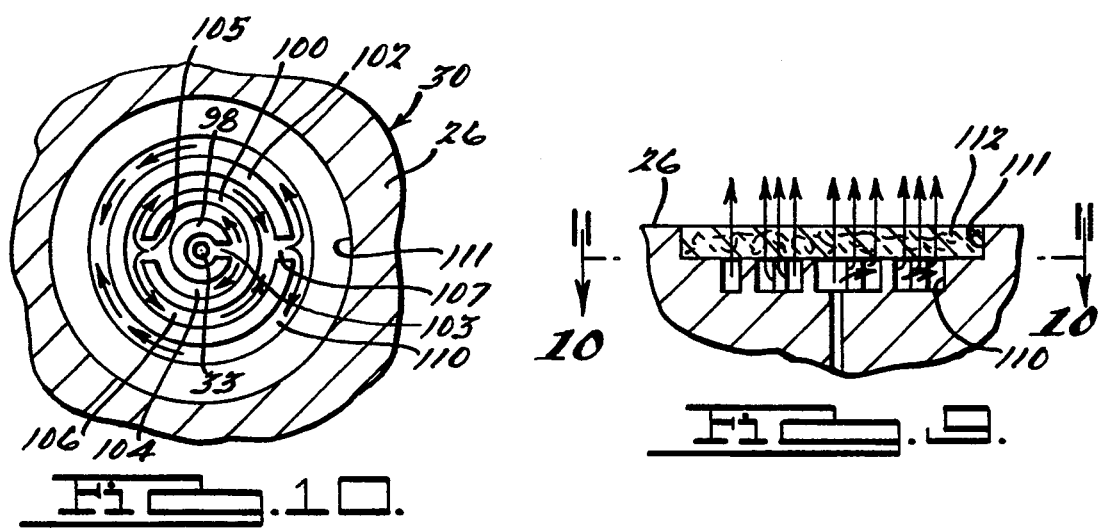
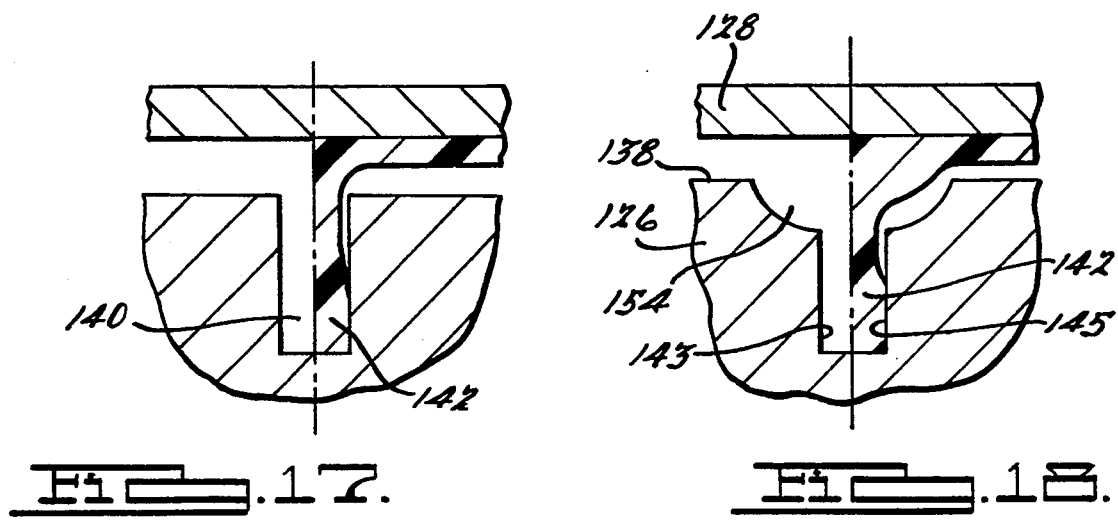

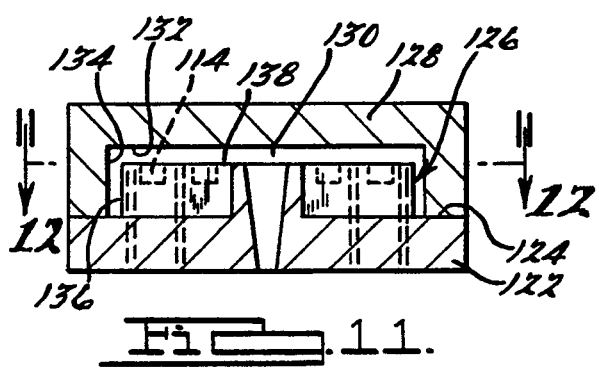
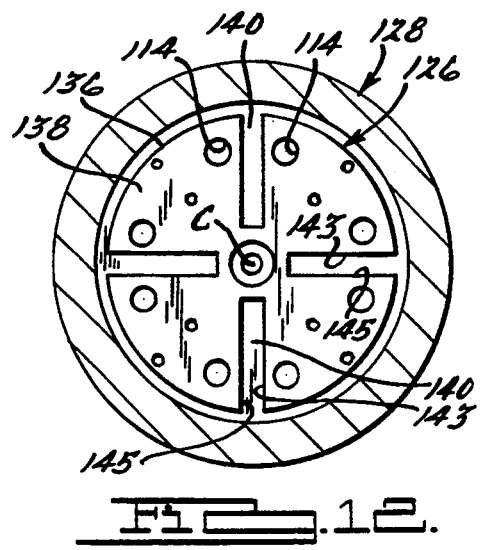
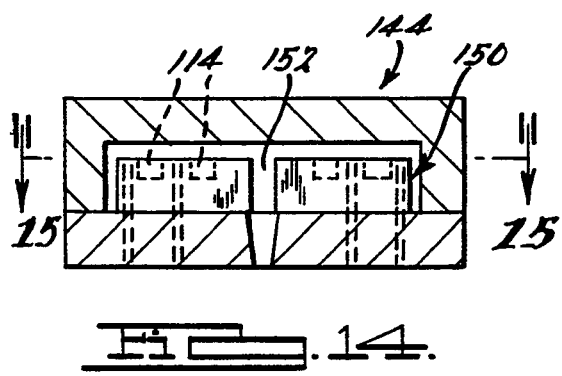
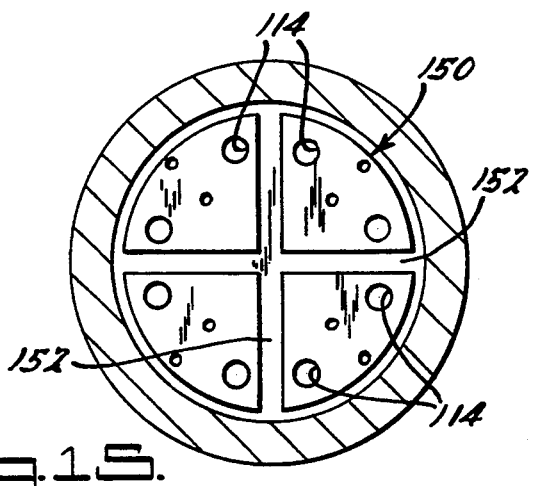
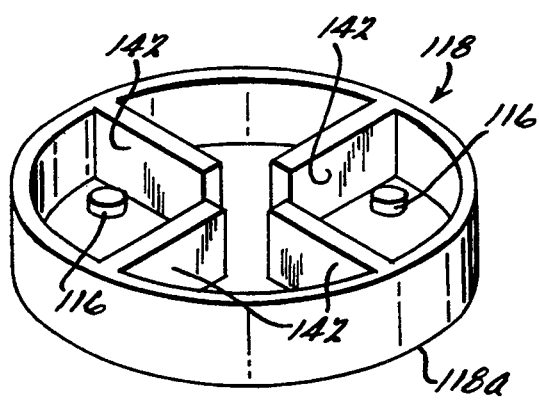
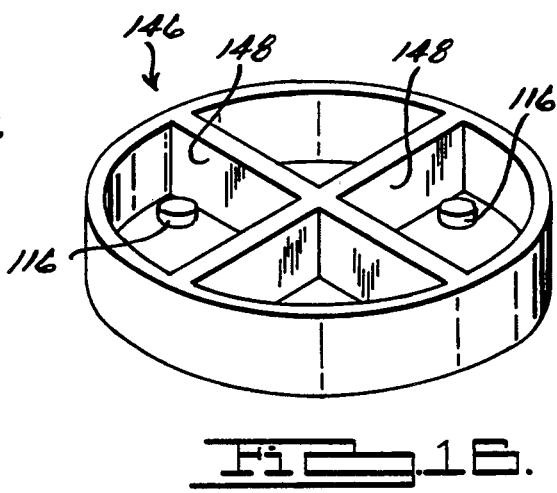

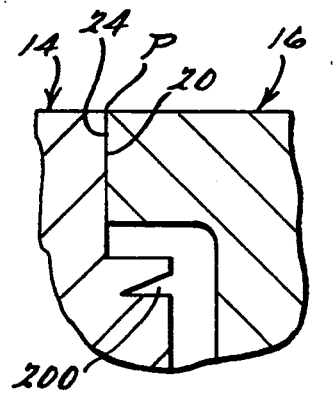
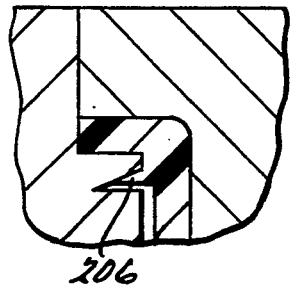
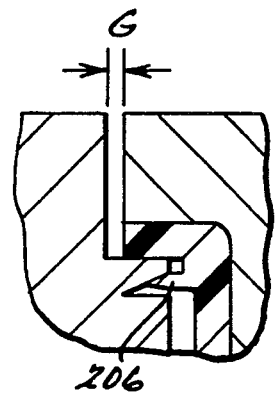
FIG. 20A.   FIG. 20B.   FIG. 20C.
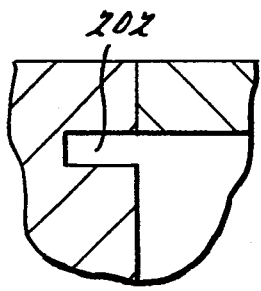
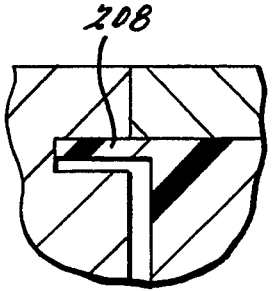
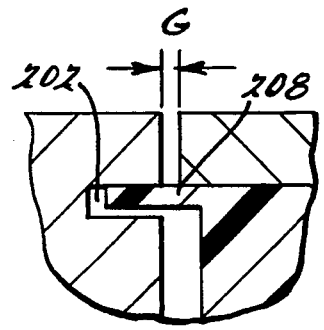
FIG. 21A.   FIG. 21B.   FIG. 21C.
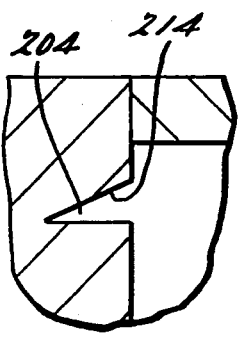
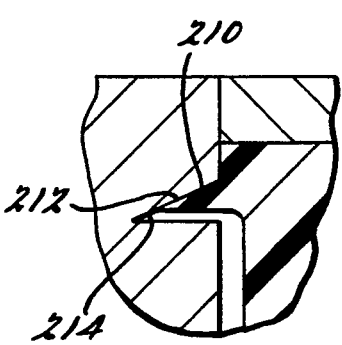
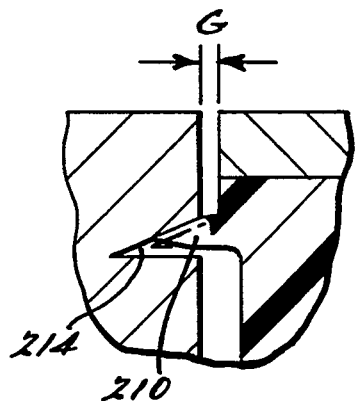
FIG. 22A   FIG. 22B   FIG. 22C

METHOD FOR FLUID COMPRESSION OF INJECTION MOLDED PLASTIC MATERIAL

CROSS-REFERENCE TO RELATED APPLICATION

This invention is a continuation-in-part of U.S. patent application Ser. No. 07/855,236, filed Mar. 23, 1992, now abandoned.

BACKGROUND OF THE INVENTION

The present invention relates to a method and apparatus for fluid compression of flowable plastic material following injection of the plastic into a mold cavity whereby to form a solid injection molded part having no internal voids, that is substantially strain free, and has a Class A finish and sink-free surface.

Injection molds typically comprise stationary and moving mold halves (i.e., the core side and cavity side) which are closed and clamped together to form a mold cavity therebetween for shaping articles from thermoplastic compositions. The thermoplastic is heated into a molten condition and injected under pressure through a nozzle and into the mold cavity by means of a screw ram. Injection pressures of 2,000 to 10,000 psi are common at the gate locations. The plastic is allowed to cool to sufficiently harden the thermoplastic whereupon the mold is opened and the hardened articles removed.

A traditional plastic molding problem is the formation of surface distortions or "sink marks" on the appearance side caused by ribs or bosses on the backside of a part resulting from the volume contraction (i.e., shrinkage) of the plastic during cooling. Further, warpage or part distortion can result from the high injection pressures used to fill the cavity, the pack out pressure, or from an uneven pressure gradient resulting from the injection pressure at the gate being higher than the pressures at the extreme ends of the molding. High injection pressures can cause strain marks or molded in strain in the hardened article, resulting in warpage at once, or over a period of time after molding, or if the end use of the molding is in a high temperature area. When ribs are formed in the molding, due to a shrinkage differential, the wall thickness versus rib configuration can cause the ribs to buckle or bend the molding. In large projected area moldings where the plastic cannot flow from the gate to the end of the molding, hot runner molds are needed and high clamping force presses (e.g., 5,000 tons and greater) are required to hold the mold halves together. These molds are costlier to build, and the multiple gating adds weld lines to the product. These weld lines are unsightly and weaken the molded part. Machines which can provide these high clamping forces are costly to operate.

In what has come to be known as "gas assisted injection molding" an inert gas is injected through the plastic injection nozzle and directly into the thick areas of the melted thermoplastic, whereby to create hollow sections in the part. With the gas assisted molding process, sink marks and warpage can be minimized, and possibly eliminated. The gas is directed through a hollow (i.e., gas channel) of the material formed between the surface of the part and a backside detail, such as a rib. If so, the base of the rib must be made thicker to help direct the gas channel, which is just the opposite of normal design practice with plastic where ribs are made as thin as possible to try and eliminate shrinkage. With the gas channel at the base of a rib, material will shrink away from the inside surface of the channel as the molded part cools because the material is the hottest at the center of the section. Therefore, as the plastic part shrinks during cooling, the sink mark on the visible outside surface is minimized.

A disadvantage in such gas assisted molding operations is that the gas pressure within the channels must be released prior to opening the mold, which normally requires costly post molding steps of venting the pressurized gas to atmosphere and then sealing or finishing this hole. Oftentimes sealing of this vent hole is needed, such as where the appearance or function of the part is affected, or to obviate the possibility of the part contaminating various chemical baths during secondary operations, such as chrome plating or painting.

Additionally, the possibility of achieving a Class A surface is inhibited by shadow marks caused by gas holes in the thicker areas of the molding, and gas permeation caused by the gas not being retained in the thicker areas and overflowing into the wall thickness of the molding. This causes thinning and weakening of the wall, raised areas, and blush marks.

In the gas assisted process, the gas used during the molding operation can be recovered to some extent but the chances are it will be full of volatiles from the molded polymer which would need to be removed. However, there are dangers in compressing inert gas with a volatile gas (e.g., fire).

Additionally, with gas assistance, costly apparatus is needed in the form of gas compression units, nozzles, pins and the like to introduce the gas into the molding. Further, to operate these units at the high pressures needed (e.g., 9,000 psi) is energy costly, the gas used and lost is costly, and the cost of maintenance is high.

Injection molding of parts utilizing a pressurized gas source is shown in "Injection Mold Method and Apparatus," published 14 Jun. 1990 as PCT Publication WO 90/06220, the specification being specifically incorporated herein by reference. While this process is suitable for molding articles of the type shown therein, there is always a need for improvements in forming low cost articles.

The primary objects of this invention are to provide a method and apparatus which enhances the low cost production of a plastic molded part which is stress-free, has a Class A surface condition, is free of "sink-marks" or "blush-marks" on the appearance surface, has no gas internally in the part or voids internally of the plastic, avoids permeation and witness lines, does not require venting the fluid pressure within the molded part, provides a constant gas pressure across an inner surface of molten plastic used to form the mold part, and allows for the reclaiming of the fluid (i.e., gas) with reduced volatile content for reuse in the process.

Yet another object of this invention is provision of mold apparatus which eliminates the need for gas channels to communicate gas to remote locations whereby to form free-standing bosses, stiffeners, and other structural details.

A further object of this invention is provision of a self-sealing arrangement during molding and curing to prevent the forming gas from either migrating around the thermoplastic to force the molten plastic away from the mold cavity surface used to form the finished surface or escaping across the parting line of mold sections and outwardly from the mold cavity. In particular, the method and apparatus according to this invention are utilized in a manner to ensure that the entire inner surface of the injected flowable thermoplastic used to make the molded part will be subjected to the same uniform pressure, and the appearance surface is prevented from receiving forming gas due to the thermoplastic cooperating to form a gas seal ring.

A further object of this invention is provision of an injection molded, gas compressed, dimensionally stable, thermoplastic part having reduced wall thicknesses, without the need for either reinforcement ribs, as desired, or internal gas cavities.

Yet another object of this invention is provision of a process that is efficient, requires lesser pressure to form a part, reduces the clamping forces needed to retain the molds together against the pressure, obviates venting, and advantageously uses at least part of the forming pressure to assist in ejection of the finished part upon opening of the mold portions.

A yet further object of this invention is provision of fluid inlets which are efficient to provide a uniform gas pressure across the inner surface of the injected thermoplastic and are less costly than conventional nozzles and injection valves.

A further object of this invention is provision of a gas recirculation arrangement that enhances the cooling of the part.

SUMMARY OF THE INVENTION

A method of and apparatus for fluid compression of injection molded plastic material are provided to form a strain free part having no internal voids, a Class A finish, and sink-free surface. The apparatus comprises stationary and movable mold portions which are moved between an open position and a closed position to define a mold cavity of the shape of the desired part, at least one plastic injection valve for injecting melted plastic into the mold cavity, and at least one gas inlet valve for introducing pressurized gas into the cavity. The mold portions close to form a parting line and define confronting mold cavity surfaces and the stationary mold portion is provided with one or more gas inlets that open into the mold cavity.

In accordance with the invention, the plastic can be injected into the mold cavity through either of the mold portions or laterally through the parting line but is illustrated as being centrally injected through the stationary mold portion. Pressurized inert gas, such as nitrogen, is introduced through the gas inlets and into the mold cavity and operates to uniformly force the molten thermoplastic away from the cavity walls of one mold portion and against the cavity walls of the other mold portion to form the finished outer surface of the part.

The gas can be introduced following the injection of the plastic and can be used to force the mold portions away whereby to increase the mold cavity volume and distribute the gas uniformly across the thermoplastic. Thereafter, the mold portions are driven together, causing the gas in the mold cavity to be compressed.

Also, the mold portions can be separated, whereupon the heated thermoplastic and the pressurized gas are introduced into the mold cavity. Thereafter, the mold portions are driven together.

To prevent gas from escaping from the mold cavity, such as via the parting line, and from migrating around the inner surface of the injected plastic to the finished outer surface of the part, a continuous recess is formed in the mold surfaces of either the cavity or core sides and in encircling relation to the gas inlets, and a pair of generally concentric continuous grooves are formed outside of the mold cavity and in the parting line defined by the confronting surfaces of the mold portions. The recess receives thermoplastic forced thereinto during the injection step and the pressurized gas acts to continuously force the thermoplastic against a wall of the recess during cooling and shrinkage of the thermoplastic whereby to form a seal ring that extends from the inner surface of the molding and prevents gas from escaping from the cavity. The inner groove is adapted to provide a low pressure path, such as for controlled recycling of the gas from the mold cavity, and the outer groove is sized to receive an O-ring and to form a seal about the inner groove.

Preferably, and in accordance with this invention, one of the mold portions (e.g., the core side) can include a plurality of recesses to form free-standing bosses, or an upwardly extending core body having a plurality of rib forming chambers that fill with thermoplastic. The chambers form ribs on the inner side of the part and these ribs can be continuous, interrupted, and used in combination with the recesses to form free-standing bosses. Additionally, the walls of the rib forming chambers can be provided with a stepped portion to form an increased volume area for the plastic to flow into to drive the plastic outwardly whereby to inhibit shrinkage of the part and separation of its exterior appearance surface from contact with the mold cavity surface.

Advantageously, the method and apparatus herein allows formation of free-standing bosses and ribs without the need for gas channels which extend thereto, as is needed with traditional gas assisted injection molding. This allows flexibility in design whereby all ribs that are not needed for strengthening the molding, but are only there to inhibit shrinkage in remote areas of thick sections of the mold, can be eliminated.

Further, moldings can be made using low pressures and low clamping forces, and eliminating the need for hot runners.

Advantageously, the pressurized gas uniformly urges the plastic away from one of the mold portions and against the other mold portion to inhibit shrinkage of the molded part from contact with the mold surface of the other mold portion, and can also be used to eject the part from the mold cavity, whereby to obviate the use of ejector pins which can cause surface indentations.

Advantageously, control over the gas utilized can be reclaimed to save energy costs and gas costs, and recirculated to enhance cooling and reduce time required for the molds to cool between cycles.

A further advantage of a mold apparatus having the rib forming channels is provision of a reinforced structural part while providing a surface having a sink-free Class A finish free of permeation marks, blush marks, etc.

Additionally, gas compression of injection molded plastic allows formation of structural parts of thin and thick cross-sections.

BRIEF DESCRIPTION OF THE DRAWINGS

Other objects, features and advantages of the invention will be apparent from the written description and the drawings in which:

FIG. 3 is a perspective view of the bottom surface of an injection compression molded part made in accordance with the injection mold apparatus of FIG. 1.

FIGS. 9 and 10 are sectional elevation and plan views, taken about line 8 of the mold apparatus of FIG. 1, showing detail of a gas inlet in accordance with this invention.

FIG. 11 is a sectional elevation view, in accordance with this invention, of another embodiment of an injection mold apparatus, particularly for providing discontinuous reinforcement ribs.

FIG. 12 is a plan view taken along line 12—12 of FIG. 11 showing the stationary core side of the mold apparatus.

FIG. 13 is a perspective view of the bottom surface of a part made in accordance with the apparatus of FIGS. 11 and 12.

FIGS. 14 and 15 are sectional elevation and plan views, similar to FIGS. 11 and 12, showing an alternate preferred embodiment of the mold apparatus in accordance with this invention.

FIG. 16 is a perspective view of the bottom surface of a part made in accordance with the apparatus of FIGS. 14 and 15.

FIG. 17 is a sectional elevation view taken along line 16—16 of FIG. 12 showing a rib forming chamber divided into two halves, respectively, before and after thermoplastic and gas are introduced into the mold cavity.

FIG. 18 is similar to FIG. 17 and shows an alternate embodiment of a rib forming chamber having a gas tributary.

FIGS. 20A, 20B and 20C illustrate the mold halves shown in FIG. 19 in closed and partially separated positions.

FIGS. 21A, 21B and 21C illustrate an additional exemplary embodiment of the mold halves shown in FIG. 19 in closed and partially separated positions.

FIGS. 22A, 22B and 22C illustrate an additional exemplary embodiment of the mold halves shown in FIG. 19 in closed and partially separated positions.

DETAILED DESCRIPTION OF THE PREFERRED EMBODIMENT

Figure 1:
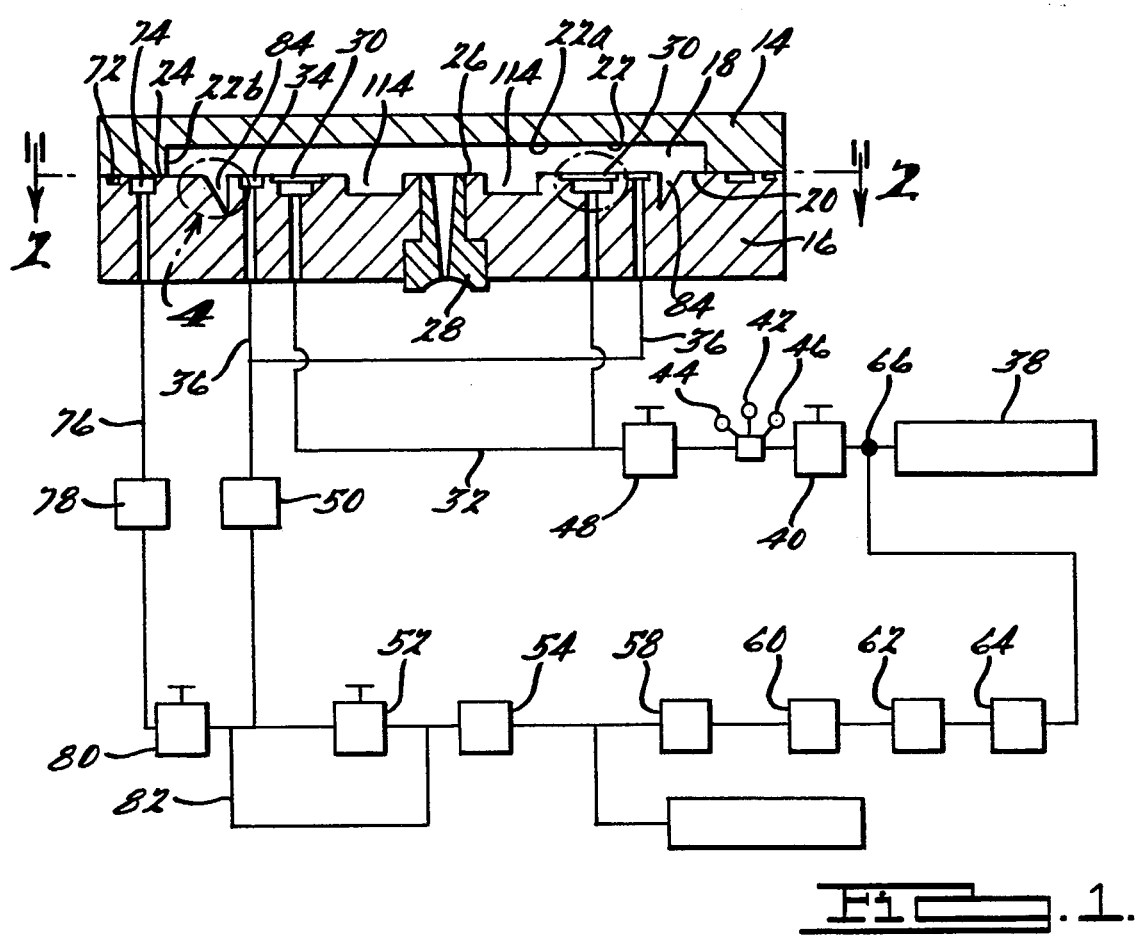
FIG. 1 is a sectional elevation view, in accordance with this invention, taken through a portion of an injection mold apparatus in a closed position to form a mold cavity and showing a recycling system to remove, save and reuse the gas.
Figure 2:
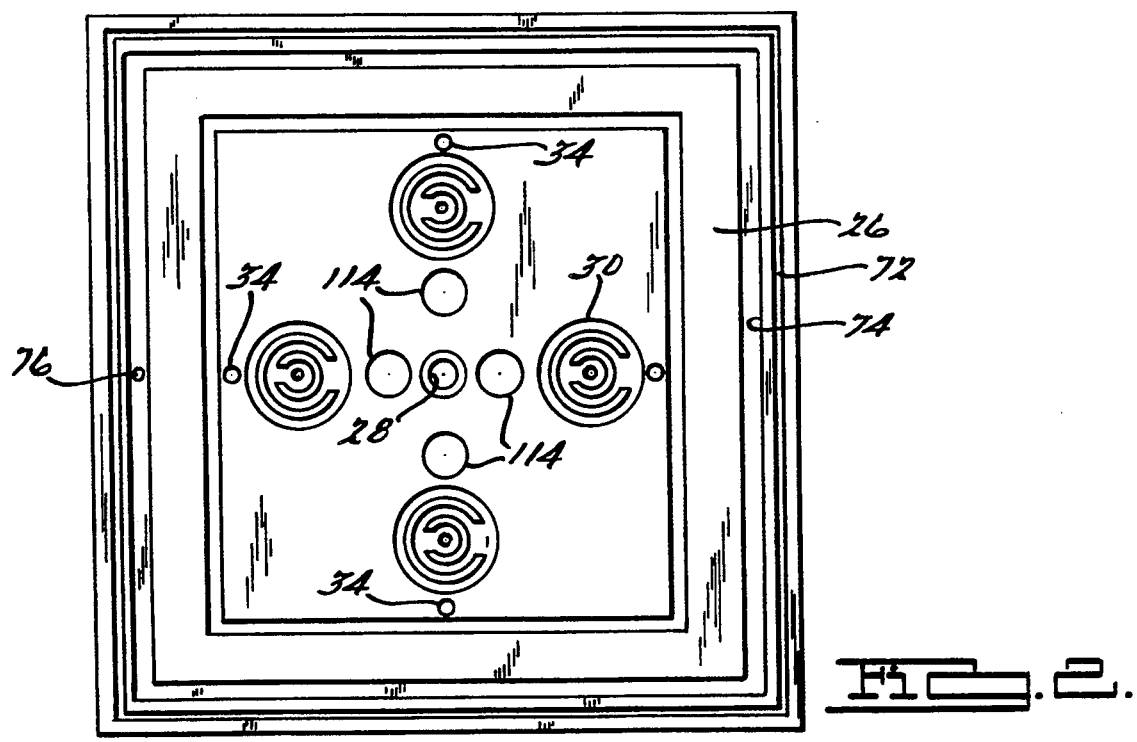
FIG. 2 is a plan view taken through the parting line of the apparatus along line 2—2 of FIG. 1, showing the stationary core side of the mold apparatus.

Referring now to the drawings, in accordance with this invention, a mold apparatus is used to form a structural part having a finished sink-free Class A exterior surface. It is to be understood that the invention could be used to form parts having different configurations, such as with reinforcing ribs, or without reinforcing ribs, or with free-standing bosses, or with reinforcing ribs and free standing bosses or in combination with other structural detail, such as wall portions. Additionally, in the practice of the invention the gas can be introduced from either or both sides of the mold cavity, such as where the plastic is introduced laterally.

Turning now to FIGS. 1 and 3, in accordance with this invention, a part 10 is formed by a mold apparatus 12. The mold apparatus 12 comprises movable and stationary mold portions 14 and 16 which are relatively movable between an open position (not shown), whereby the mold portions are spaced from one another and the finished part 10 can be removed, and a closed position (as shown). When the mold portions are in the closed position, the mold portions cooperate to define a mold cavity 18 for forming the part 10. While not shown, the stationary mold portion is fixed to a conventional molding machine and a conventional screw ram to receive melted plastic material injected into the mold cavity 18. Further, a clamping arrangement is connected to the mold portions for holding the mold halves together when in the closed position. The screw ram and clamping arrangement are conventional and would be understood by those skilled in the art. Illustrative are the arrangements described in the hereinabove incorporated PCT WO 90/06220.

The movable mold portion 14 has a bottom surface which comprises a first surface portion 20 which is exterior to the mold cavity and a second surface portion 22 which defines the interior of the mold cavity and forms the finished appearance surface of the desired part. As shown, the interior surface portion 22 comprises a flat upper wall 22a and an endwall 22b.

The stationary mold portion 16 has a top surface which comprises a first surface portion 24 which is exterior to the mold cavity and forms a support surface for the corresponding exterior surface portion 20 and a second surface portion 26, the exterior first surface portions 20 and 24 defining a parting line "P". The mold cavity 18 is defined by the interior surface portions 22 and 26, which are confronting. A plastic sprue bushing 28 is positioned to allow injected melted thermoplastic resin through the surface 26 and into the mold cavity. The volume of melted plastic is of a predetermined amount to substantially fill the mold cavity but of a volume less than that necessary for a complete packing. Although the volume injected could be between 90–99.9% of the total volume of the cavity, in one application, the plastic filled about 97.4% of the mold cavity total volume.

An inert pressurized gas, such as nitrogen, is injected into the mold cavity 18 through one or more gas inlets 30 located in the surface 26 of the stationary mold portion 16, whereby to pressurize the core side of the cavity and force the melted plastic material against the surfaces 22a and 22b of the movable mold portion 14. Preferably, to assure uniformity of resin distribution, the gas inlets are generally symmetrically disposed and each is connected via a gas inlet line 32 to a gas source at a predetermined pressure. While each gas inlet is shown separately connected to a common source, each inlet could be connected to a separate pressure source.

In accordance with an important aspect of the invention, a plurality of gas outlets 34 are provided (1) to reduce pressure in the cavity, and (2) cool the part by allowing recirculation of the gas used in compression of the hot melted thermoplastic. The outlets 34 communicate with the cavity 18 via the surface 26 and allow gas to pass outwardly of the cavity via the return lines 36.

Nitrogen gas is supplied to the inlet line 32 from a source of nitrogen, shown by the pressurized bottle at 38. The bottle 38 includes a shutoff valve 40, a regulator 42, and gages 44 and 46 respectively to indicate the process pressure and pressure in the bottle. Gas is supplied at the desired pressure via an electrically operated directional control valve 48.

A gas recycle system to remove, save and reuse the gas during and following the molding operation is provided. The return lines 36 are connected together and, in series, to a check valve 50, gas directional valve 52, a pressure reducing valve 54 and a nitrogen receiver 56. A pressure switch 58 connects the nitrogen with a cooler 60, such as a heat exchanger, a pump 62, a check valve 64, and into the supply 38 at 66. The pump 62 is used to compress (i.e., pressurize) the gas from the cavity and resupply cooled and pressurized nitrogen directly to the system. In one operation, the nitrogen gas from the source 38 was pressurized by the pump to 2,400 psi and the regulator 42 was set at 1,000 psi.

In accordance with the recapture aspect of this invention, a pair of concentric outer and inner grooves 72 and 74 are formed in the surface 24 of the mold portion 16. The outer groove 72 is sized to receive an O-ring to be compressed by the surfaces 20 and 24 and form a gas seal about the mold cavity. The inner groove 74 communicates gas in the cavity which was heated by contact with the plastic with a low pressure outlet return line 76 to the nitrogen receiver 56 via a pressure reducing valve 78, and a directional control valve 80. If desired this gas can be communicated directly into the directional valve 50, or bypass the valve 50 via bypass line 82.

Preferably and in accordance with this invention, FIGS. 4A–4B, 5A–5B, 6A–6B, 7 and 8 show a gas seal arrangement utilized to prevent gas from escaping from the mold cavity or migrating to the outer surface of the thermoplastic. After the plastic is injected into the cavity, the plastic will tend to shrink. If the injected gas should migrate from the "inner" gas compression side of the thermoplastic and into the interface formed between the mold cavity wall formed by 22a and 22b, which surfaces define the shaped finished exterior appearance surface of the part 10 (i.e., the "outer" compressed surface of the plastic), the gas will force the plastic away from the mold and destroy the formation of the Class A surface. To inhibit this from happening, a continuous recess is formed in the mold portion 16, at a remote location of the surface 26 from which gas is introduced into the cavity, and in encircling relation to the gas inlets 30. The recess will receive the thermoplastic during injection of the thermoplastic into the cavity, whereupon the thermoplastic will harden during cooling to form a continuous ring. During the cooling phase, the gas continuously forces the molten plastic against a surface of the recess to inhibit gas escape from the mold cavity, such as via the parting line closure between the mold portions.

Figure 4A:
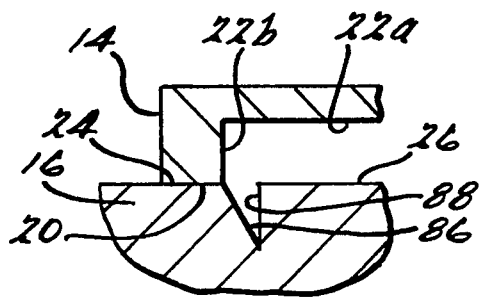
FIGS. 4A and 4B are sectional elevation views, before and after plastic injection, taken about line 4 of the mold apparatus of FIG. 1, showing formation of a gas seal arrangement to prevent gas from escaping from the mold cavity via the mold parting line or migrating from the core side to the finished surface of the part.
Figure 4B:
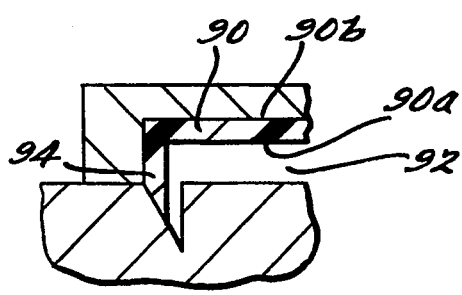

In the embodiment shown in FIG. 4A, a continuous V-shaped recess 84 is formed in the surface 26 of the mold portion 16 so as to be in encircling relation to the gas inlets 30, as well as the gas outlets 34. The recess 84 includes an inclined wall 86 which extends downwardly from the surface 26, and inwardly towards the gas inlets whereby to intersect with a vertical wall 88. In FIG. 4B, heated, melted, flowable thermoplastic 90 has been injected into the mold cavity and, in part, into the recess 84. The pressurized gas forces the outer surface 90b of the plastic toward the surfaces 22a and 22b, and forms a reduced gas cavity 92 between the surface 26 and the inner surface 90a of the thermoplastic. During cooling and while the pressure is maintained, the gas cavity part will undergo some shrinkage. However, escape of gas from the mold cavity is prevented by the action of the gas constantly forcing the plastic material against the inclined wall 86, resulting in a seal ring 94. As shown in FIG. 3, the gas seal ring is formed on the back side 10b of the part 10.

Figure 5A:
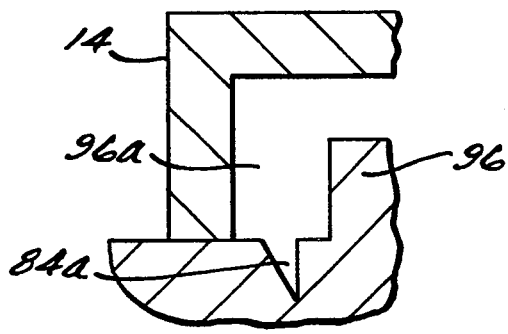
FIGS. 5A and 5B, 6A and 6B, 7 and 8 illustrate additional preferred embodiments of a gas seal arrangement.
Figure 5B:
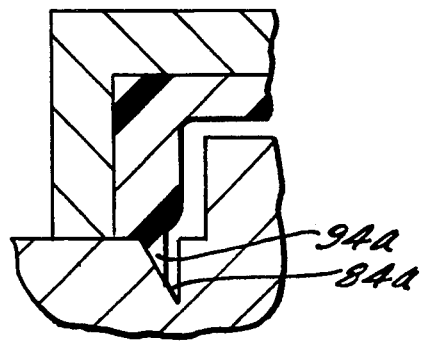

FIGS. 5A and 5B show the mold portion 16 as including a core body 96, an annulus 96a being defined between the core body and the movable mold portion 14, and a continuous V-shaped recess 84a being formed in the surface 26. Plastic driven into the recess 84a forms a seal ring 94a that prevents gas from escaping from the mold cavity or reaching the finished surface.

Figure 6A:
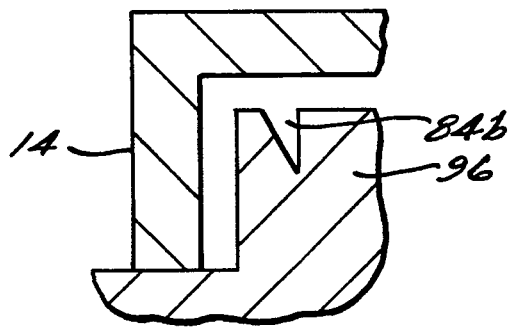
Figure 6B:
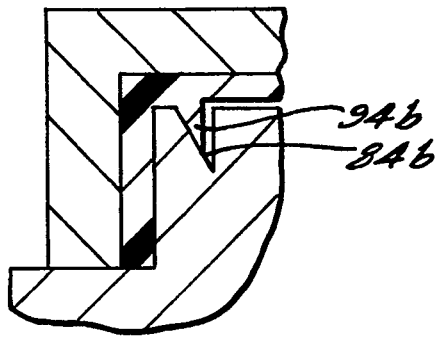

FIGS. 6A and 6B show a continuous V-shaped recess 84b being formed in an upper surface of the core body 96. In this embodiment, a cake-pan shaped article can be formed, such as that described in connection with FIGS. 11–14. A gas seal ring 94b would be formed on a back side of the part and at an unseen location adjacent to the junction between the flat and cylindrical walls of the part.

Figure 7:
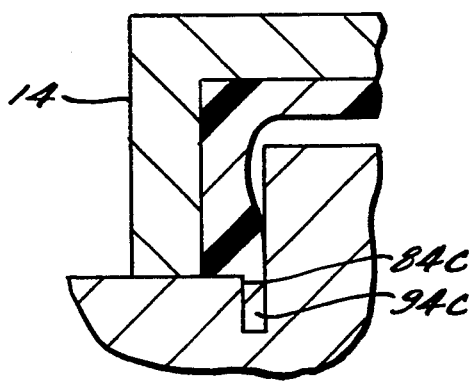

FIG. 7 is similar to that described in connection with FIG. 4A and show a continuous "squared" recess 84c extending vertically below the parting line. Thermoplastic is forced into the recess to form a continuous annular wall, whereby to form a seal ring 94c which prevents gas escape from the mold.

Figure 8:
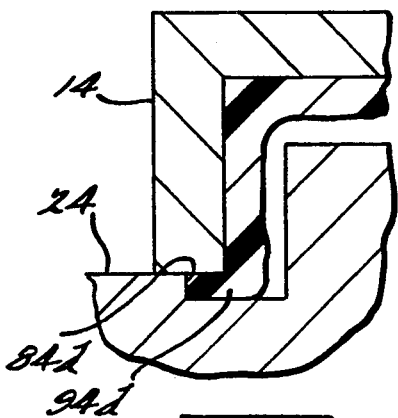

FIG. 8 is similar to that described in connection with FIG. 5A and the gas seal ring is formed by a flat, shallow annular recess 84d in the surface 24 and extending below the parting line surface "P", and located in part under the mold portion 14 and in the mold cavity. The annular recess 84d receives plastic and forms a continuous gas seal ring 94d. This ring would be "flash" that would be removed in a post-molding operation.

FIGS. 9 and 10, in accordance with another important aspect of this invention, show details of the novel gas inlet 30 to provide gas to the mold cavity. A plurality of concentric C-shaped wall sections 98, 100 and 102 (and associated gas passages 104, 106 and 108, extending cylindrically, and passages 103, 105 and 107, extending radially) are disposed in concentric relation in the surface 26 and the gas line 32 has its opening 33 located centrally of the central wall section 98. The wall sections are located in a chamber 110 which is in a recess 111 below the surface 26 and covered by a circular porous sintered metal disk 112. As shown the inner and outer of the C-shaped wall sections 98 and 102 have the radial passages 103 and 107 face in a direction oppositely to the direction of the radial passage 105 of the center C-shaped wall section 104. This arrangement advantageously results in a greater velocity of gas flow axially and in a swirling movement of the gas around the gas passages, which has a beneficial result on the finished surface of the part as a result of improved circulation of the gas.

The disk 112 could be of any suitable density, consistent with the pressure drop desired (i.e., a lower micron opening, the greater the pressure drop, and vice versa).

While it is believed the filter disk could be between 2–40 microns, a 5 micron filter disk was found preferable.

While discrete gas inlets are shown, it is to be understood that to accomplish uniform gas pressure over the inner surface of the thermoplastic, the entire surface 26 of the stationary mold portion 16 could be provided with a series of interconnected gas flow passages and one or more associated gas inlets 33. Although a porous metal disk is described herein, a poppet valve of the type shown by the hereinabove incorporated PCT Publication No. WO 90/06220 can also be used.

Another important feature is the capability of forming free-standing structural parts, such as reinforcement ribs or bosses needed for attachment. As shown in FIG. 1, a plurality of cylindrical recesses 114 are formed in the surface 26, which cooperate to form a corresponding series of bosses 116 which project from the bottom surface of the molded part.

The part 10 formed by the apparatus of FIGS. 1–10 is shown in FIG. 3, including on the rear (i.e., bottom) surface 10b the seal ring 94 and a series of bosses 116 encircled by the ring. The top surface shown at 10a defines the exterior appearance surface having a sink-free, Class A finish.

In accordance with this invention, a cake pan article 118 is made from a mold apparatus 120 shown in FIGS. 11–13. The apparatus comprises a stationary mold portion 122 that includes a support surface 124 and a cylindrical core body 126 extending upwardly therefrom, and a movable mold portion 128 having a recess sized to receive the core body 126 and form a mold cavity 130 therebetween. The mold portion 128 includes flat and cylindrical surfaces 132 and 134 that form the finished outer appearance surface 118a of the part. The core body 126 is generally cylindrical and includes an outer cylindrical surface 136 which confronts the cylindrical surface 134 and an upper flat surface 138 which confronts the flat surface 132. The cylindrical and flat surfaces 136 and 138 form the interior surface 118b of the cake-pan shaped part 118.

Preferably and in accordance with this invention, a plurality of rib forming chambers 140 are provided in the core body 126 for forming associated planar ribs 142 in the part 118. As shown, four chambers 140 extend radially inwardly from the outer cylindrical surface 136 and axially downwardly from the flat surface 138. The chambers stop short of the geometrical center "C" of the core body and define a pair of spaced-apart parallel sidewalls 143 and 145 and the separation between the sidewalls is about equal to or slightly less than the thickness of the cylindrical wall of the part 118 (i.e., the distance generally defined between the inner and outer surfaces 134 and 136 of the cavity). The chambers generally divide the core body 126 into four equal quadrants, each chamber being adapted to receive plastic injected into the mold cavity and each forming discontinuous ribs 142.

The upper flat surface 138 of the core body 126 could, if desired, include appropriate recesses 114 for forming free-standing bosses 116, as described in connection with the part 10. Further, the outlet from the sprue bushing 28, and the gas inlets 30 would also be provided on this surface. The inlets for the gas and plastic could be otherwise.

The structural part 118 made from the apparatus 120 comprises a cake-pan shaped member comprising a flat endwall in the form of a generally circular plate having inner and outer surfaces, a sidewall in the form of a cylindrical skirt having concentric inner and outer surfaces, a plurality of free standing bosses 116 projecting from the interior surface 118b of the endwall, and a plurality of planar ribs 142. The ribs 142 are integrally formed with the flat endwall and the cylindrical skirt and each extends generally perpendicularly downwardly from the inner surface of the endwall and radially inwardly from the inner surface of the skirt.

An important feature herein resides in the relationship of the ribs 142 to the cylindrical sidewall and flat endwall. During gas compression, to be described, the material used to form the ribs enhances the dimensional stability of the part 118 and maintains the outer surfaces and in a finished sink-free condition so as to be directly ready for post molding operations.

The mold apparatus 144 shown in FIGS. 14–16 forms a part 146 that is similar to the part 118 but is provided with a plurality of reinforcing ribs 148 that are continuous and intersect with one another. The core body 150 comprises four quadrants which define rib forming chambers 152 and has recesses 114 in a top surface thereof for forming bosses 116. As can be appreciated, the method herein is not restricted to the use of discontinuous ribs, such as those shown at 142 on the part 118. Importantly, both free-standing ribs 148 and bosses 116 can be provided.

FIGS. 17 and 18, show the rib forming chamber 140 as being generally rectangular and illustrate the formation of a rib 142. In each of these Figures, the chamber 140 is split into right and left halves to show the chamber before and after plastic injection.

In the right half FIG. 17, a quantity of melted plastic compression has been injected into the mold cavity and into the rib forming chamber 140. Pressurized gas introduced into the cavity thereafter drives against the inner surface of the melted plastic and drives the plastic against the mold portion and into the chamber, whereby to form the rib 142. Thereafter, the pressure is maintained and the part allowed to cool. During cooling of the thermoplastic, the pressurized gas assures that the finished surface of the part does not have any "sink marks" resulting from material contraction adjacent the rib chamber. The gas pressure constantly forces cooling material upwardly towards the wall surface of the upper mold portion whereby to inhibit shrinking of the material adjacent the rib 142 during cooling of the part.

FIG. 18, in accordance with another aspect of this invention, the flat surface 138 of the core body 126 is shown being provided with a "step" whereby each rib forming chamber 140 is formed with an increased plastic volume area 154 for the plastic to flow into to drive the plastic radially outwardly and vertically upwardly against the interior surfaces of the movable mold portion. In the embodiment shown, arcuate C-shaped surface portions extend downwardly from the core surface 138 and into each of the two respective sidewalls 143 and 145 of the chamber, the surface portions forming the recessed step 154. The gas surface portions could be otherwise, such as forming a "squared step" portion.

There are no restrictions on the thermoplastic resins that can be used in the practice of the method herein. By way of illustration the method can be applied not only to general purpose plastics such as polyolefins, polystyrene, ABS resins, AS resins, PVC resins, methacrylic resins and fluorine based resins but also engineering plastics such as nylon, saturated polyester resins, polycarbonate resins, polyacetal resins, polysulfones and modified polyphenylene ether resins. The method can also be used with fiber reinforced resins. For example, suitable ABS thermoplastic compositions would be the relatively hard polymers, such as Cycolac, a trade name of General Electric, or Krylastic a trade name of Uniroyal.

In the method, the mold portions are closed, and the electrically controlled directional valves 48, 52 and 80 are de-energized (i.e., closed). Hot melted, flowable, thermoplastic is injected through the sprue bushing 28 and into the mold cavity 18, into the shaped recess 84, as well as into the recesses 114 and chambers 142, where such are provided. The plastic injected will be in an amount to nearly completely fill the cavity, but not fully pack the cavity. Immediately thereafter, or after a timed delay, the directional control valve 48 is energized (i.e., opened) which will allow gas at the desired pressure from the bottle 38, to pass through the inlet lines 32, through the gas inlets 30, and into the mold cavity. The inert gas would supplied at a pressure sufficient to urge the plastic to the opposite side of the mold from the gas inlet to completely form a solid molding having no internal voids, devoid of all shrinkage and strain marks. Before the polymer cools, gas will drive the melted plastic towards and against the respective walls of the mold recesses and chambers.

The pressure is maintained for 1–15 seconds, whereupon the gas directional valve 48 is closed (i.e., de-energized), which stops any further gas from entering the cavity and the part allowed to compression harden under the action of the gas. The gas seal ring 94 inhibits escape of gas from the cavity. The time period is sufficient to ensure that the entire "inner" surface of the plastic on the gas inlet side has sensed the equal pressure and lifted the plastic from the core side of the mold.

If it should happen that gas should pass beyond the seal ring 94 to the groove 74, the O-ring in groove 72 will stop its migration. The directional valve 80 can be energized (i.e., opened), which will direct the heated high pressure gas through return line 76 and along the path 82, around directional valve 80, and into the nitrogen receiver 56. The heated gas can be stored for reuse. Valve 80 is then de-energized (i.e., closed).

The initial gas forming pressure can be reduced to a second lower pressure, in continuous steps or intermittently, to make sure that the molding is not subject to too high a pressure during the transition from the liquid state to the solid state. This is where strain can be introduced into the molding. The reduced second pressure would still be sufficient to prevent sinkage. The heated gas removed from the mold cavity can be captured, cooled and recycled.

Accordingly, after a predetermined time, the directional valve 52 is energized (i.e., opened). The heated gas will then pass through the outlet 34, and through the directional valve 52, and into the nitrogen receiver 56.

Additionally, the gas in the mold cavity, heated by contact with the part, desirably, can be removed, cooled, and pressurized, and reintroduced as fresh gas into the cavity, while maintaining the desired pressure in the mold cavity, thereby continuously recirculating the gas to provide a cool gas flow to cool the plastic and inhibit sinkage. Without cooling of the heated plastic, sinkage can result. In this regard, the directional valves 48, 52 and 80 are energized. The switch 58 is tripped, at a predetermined pressure, and the pump 62 started to raise the return gas pressure to the pressure in the bottle 38.

Following hardening of the part, the mold portions 14 and 16 are separated, whereby trapped nitrogen gas will eject, or help eject, the molding. Advantageously, this obviates any marks being formed on the surfaces as may be caused by ejector pins.

While not shown, conventional apparatus is provided to control the level and duration that the pressured gas is maintained.

In the realization of this invention, conditions such as the temperature of the molten resin during injection molding, the injection pressure, and injection speed; the injection gas timing, quantity pressure and speed; and the mold cooling time, will be selected and controlled in relation to the kind of resin being used and the shape of the mold cavity, and thus cannot be unconditionally specified. Examples are described below to illustrate the present invention.

In one sample, a cake-pan shaped part similar to that shown in FIGS. 14–16 (having discontinuous stiffening ribs) was formed. About 1–5 seconds after the ABS was injected into the mold cavity, and preferably about 2.5 seconds thereafter, the plastic injection nozzle valve was closed and Nitrogen gas between 500–1,000 psi, and preferable about 650 psi, was introduced for about 5.0 seconds into the mold cavity. The gas inlet was then closed and the gas held for a period of about 30–60 seconds, and preferably about 40 seconds. Thereafter, the part was ejected.

In a second example, polypropylene was injected, as stated above, but the Nitrogen gas was between 300–550 psi, and preferably was at 500 psi.

Figure 19:
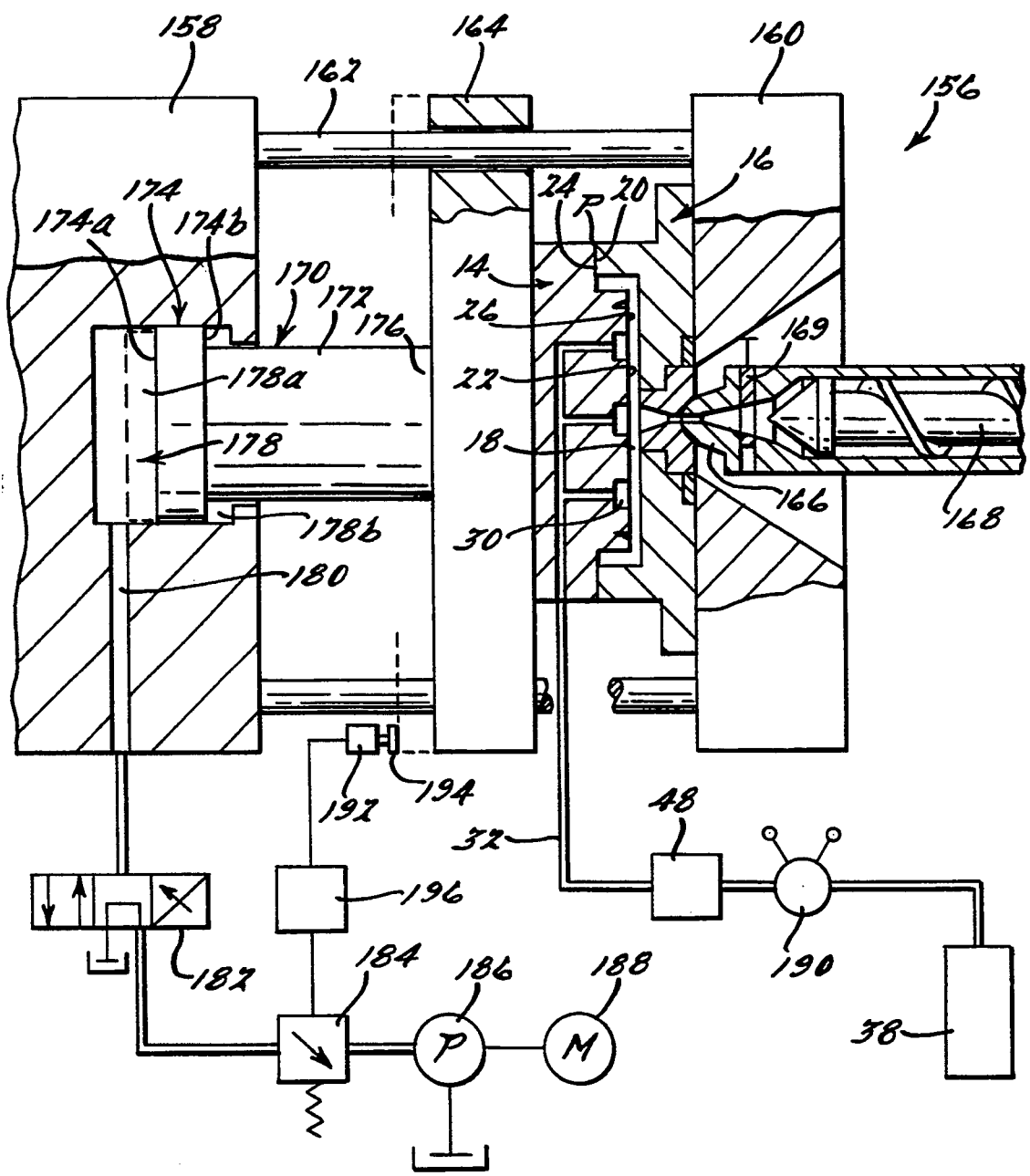
FIG. 19 is a sectional elevation view, according to another aspect of this invention, taken through a mold apparatus having a variable volume mold cavity defined by a pair of mold halves and a hydraulic clamping ram for separating and forcing the mold halves together.
Figure 23:
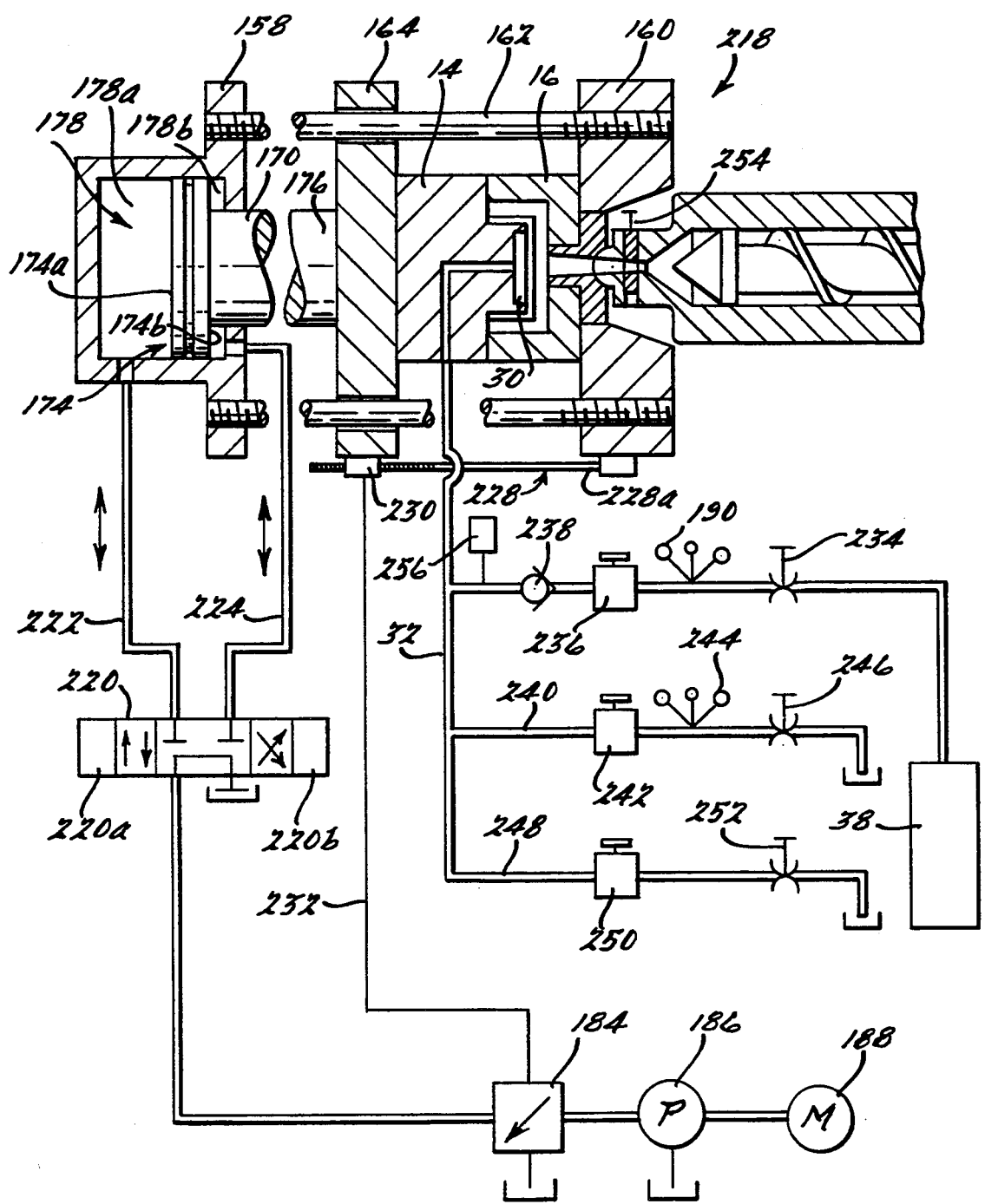
FIG. 23 is a sectional elevation view, according to another aspect of this invention, taken through a mold apparatus having a variable volume mold cavity defined by a pair of mold halves and a hydraulic clamping ram for separating and forcing the mold halves together.

According to this invention, FIGS. 19–23 illustrate further embodiments of a method and apparatus for fluid compression of injection molded plastic material to form a molded part having no internal voids and a sink free exterior. During compression molding of the molded part, the mold halves are partially separated to ensure that the entire inner surface area of the hot melted flowable thermoplastic is subjected to a uniform pressure. The mold apparatus shown in FIGS. 19 and 23 is similar to that shown in FIGS. 1–18 and the specific elements in each will be referred to by the same reference numbers, except where noted.

In FIG. 19, a mold apparatus 156 comprises relatively stationary and movable mold portions 16 and 14 which have mating surfaces 24 and 20 which are adapted to be abutted and form the parting line "P" and part defining surfaces 26 and 22 that form an interior mold cavity 18. A pair of stationary platens 158 and 160 are connected together and maintained in spaced apart relation by a plurality of axial tie bars 162 with the stationary mold portion 16 being fixedly connected to the platen 160. A third platen 164 is coupled to the tie bars for axial movement thereto and between the platens 158 and 160 and fixedly supports the movable mold portion 14 for separating and closing movement from and towards the mold portion 16.

A sprue bushing 28 is located in the stationary mold portion 16 and at an opening thereof leading to the mold cavity 18. A plastic injection nozzle 166 is seated in the sprue bushing and connected to a screw plunger 168 to supply hot melted plastic from an injection storage space (not shown) into the mold cavity. A shutoff valve 169 is adapted to close the nozzle after the melted plastic is introduced into the mold cavity whereby to prevent the plastic from being forced back into the injection molding machine.

A hydraulically driven clamping ram 170 is connected to the movable platen 164 and drives the movable mold portion 14 relative to the stationary mold portion. The clamping ram 170 has a central body 172 extending axially between end portions 174 and 176 with the "cap" end portion 174 being enlarged and formed as a piston having opposite axial end faces 174a and 174b and the "rod" end portion 176 being fixedly connected to the movable platen 164. The piston 174 is received in and divides a fluid chamber 178 into two chambers 178a and 178b which will vary in volume during movement of the piston and operation of the clamping ram.

Pressurized fluid (e.g., oil) is communicated into and from the variable volume chamber 178a along a fluid path that includes a fluid passage 180, a hydraulic fluid directional valve 182, an electronically controlled hydraulic pressure relief valve 184, and a hydraulic pump 186 driven by an electric motor 188. When the pressure relief valve 184 is energized, pressurized fluid at the pressure setting of the pressure relief valve 184 is communicated into the fluid chamber 178a.

A plurality of gas outlets 30 are positioned in the movable mold portion 14 to receive pressurized gas from a respective gas inlet line and introduce the gas into the mold cavity. The gas is supplied to the gas inlet lines via a gas supply line 32 from a high pressure source 38, through a high pressure gas reducing valve 190, and through a gas directional valve 48. As described hereinabove, the high pressure source 38 could be a gas bottle capable of storing a supply of inert gas, such as nitrogen, at a pressure of about 4,000–5,000 psi. The gas outlets 30 could comprise the sintered metal disk 112 or the poppet valves.

Further, a substantial portion of the mold cavity surface confronting the inner surface of the thermoplastic could be configured to define a gas outlet. Advantageously, this gas outlet would provide a gas distribution arrangement that ensures that the gas, when initially introduced, is uniformly distributed throughout the mold cavity and pressed against the entire inner surface of the thermoplastic.

An electronic switch 192 is provided to sense the movement (to the left in FIG. 19) of the platen 164 whereby to limit the axial travel of the clamping ram 170 and the separation of the movable mold portion 14 away from the stationary mold portion 16. While many suitable arrangements are possible, the switch 192 shown is a limit switch that includes a reed 194 which is adapted to engage the platen 164 resulting from a predetermined movement of the movable mold portion 14 away from the stationary mold portion 16. When the reed 194 is "tripped" the switch 192 transmits an electrical signal to an electronic controller 196 which is in electrical circuit relation with the pressure relief valve 184. As a result, the controller 196 transmits an electrical signal to energize the hydraulic directional valve 184, whereby pressurized fluid from the pump 186 is transmitted into the fluid chamber 178a.

The fluid pressure in chamber 178a acts against the piston face 174a to develop a closing force sufficient to overcome the separating force caused by the pressurized gas in the mold cavity 18 and thereby drive the clamping ram 170 in the mold closing direction (to the right in FIG. 19). The product of the area of the piston face 174a and fluid pressure in the chamber 178a defines a first force and the product of the area of the mold cavity surface 22 of the movable mold 14 and the gas pressure in the mold cavity 18 defines a second force. The value of these forces will determine whether the clamping ram and the mold portion 14 are driven towards or pushed away from the stationary mold portion.

According to an important feature of this invention, the clamping ram 170 and switch 192 are used to permit the movable mold portion 14 to move away from the stationary mold portion 16 and the support surfaces 20 and 24 to separate from one another by a predetermined amount. Separation of the mold portions 14 and 16 from clamped engagement will slightly increase the volume of the mold cavity but, more importantly, will also assure that the high pressure gas introduced into the mold cavity from the movable mold portion 16 will be evenly distributed throughout the cavity whereby to uniformly press against the inner surface of the hot flowable plastic and uniformly urge the outer surface of the flowable plastic against the mold cavity surface 26 of the stationary mold portion 16.

Although any separation of the mating surfaces from clamped relation would be sufficient to form a gap that would allow the gas to escape from the cavity, the mold portions are configured to include an annular recess, such as shown in connection with FIGS. 4–8, that cooperates with the plastic to form a continuous annular gas seal about the parting line to prevent such escape. The separation of the mating surfaces 20 and 24 would not be sufficient to allow plastic to enter (e.g., such as flash that would need to be removed). Further, as described hereinabove, introduction of gas into the parting line between the mold portions could be recaptured via a return line, such as by the arrangement shown and described hereinabove at 74 and 76.

FIGS. 19–22 show embodiments of an annular recess according to this invention used to form a gas seal ring. FIGS. 19 and 20A show the movable mold portion 14 having a core body 198 provided with an annular recess 200 of V-shaped cross-section. FIGS. 21A and 22A, respectively, show the mold portion 14 being provided with an annular recess 202 of rectangular cross-section and an annular recess 204 of V-shaped cross-section.

FIGS. 20B, 21B and 22B show the introduction of hot melted flowable plastic into the mold cavity 18. The molten plastic flows into the recesses 200, 202 and 204, whereby to form, respectively, the continuous gas seal rings 206, 208 and 210.

FIGS. 20C, 21C and 22C show the introduction of pressurized gas into the mold cavity. The pressurized gas forms a cushion of gas between the movable mold portion 14 and the inner surface of the plastic whereby to force the outer surface of the thermoplastic against the mold cavity surface of the stationary mold portion 16. This gas pressure is sufficient to produce a force which will drive the mold portion 14 and the clamping ram 170 axially away from the mold portion 16 thereby separating the mold portions by an amount "G" and increasing the volume of the mold cavity 18.

As illustrated in FIG. 21C, the annular rectangular shaped gas seal ring 208 formed in the recess 202 will be forced against the mold cavity surfaces and prevent gas from escaping through the gap.

As illustrated in FIG. 22C, the annular V-shaped gas seal ring 210 would ordinarily occupy the space shown by the dotted line but due to the axial separating movement of the mold portions and the geometry of the seal ring 210 relative to the recess 204, the inclined outwardly facing surface 212 of the gas seal ring 210 would be moved out of contact with the inwardly facing inclined wall 214 of the recess 204 and permit gas to escape. However, the high pressure gas in the cavity will continually bias the seal ring 210 and its inclined surface 212 against the inclined wall 214 to maintain the gas seal.

In the embodiment shown in FIG. 19, gas is introduced from the movable mold portion 14 and plastic is introduced from the stationary mold portion 16. It is to be appreciated that the plastic and the gas can be introduced into the mold cavity from the same mold portion, such as illustrated in FIG. 1. Further, the gas seal forming recesses are illustrative and could be other than that shown.

In operation, the fluid chamber 178a is pressurized. As a result, the clamping ram 170 drives the mold portion 14 to the right (as seen in FIG. 19) and against the mold portion 16, whereby the mold portions are closed. The mold portions are securely clamped together by the ram as a result of the fluid chamber 178 receiving pressurized fluid via the valve 182, at the pressure setting of the electronically controlled hydraulic pressure relief valve 184.

A predetermined amount of hot flowable plastic is then introduced into the mold cavity 18. As described hereinabove, the plastic will be sufficient to fill between 90–99.5% of the cavity but not completely pack out the cavity. The plastic shut off valve 169 is closed. After a short time delay, such as about 1 to 5 seconds, the gas directional valve 48 is energized, allowing high pressure gas from the bottle 38, at the pressure setting of gas reducing valve 190, to be passed through the gas line 32, through the gas outlets 30 and into the mold cavity 18. The high pressure gas pushes the plastic away from the mold cavity surface 22 of the movable mold portion 14, and towards and completely against the mold cavity surface 24 of the stationary mold portion 16.

The pressure setting of the high pressure gas reducing valve 190, connected to the gas pressure source 38, is set at a pressure high enough to urge the plastic to the opposite side of the mold from the gas opening before the thermoplastic cools. This high pressure gas acts against the moving mold portion 14 and produces a separating force that will overcome the clamping force produced by pressure of the pressure relief valve 184 and force the clamping ram 170 and mold portion 14 away from the stationary mold portion 16, causing the mating surfaces of the mold portions to separate and form the gap "G" along the parting line and the mold cavity surfaces to separate and increase the volume of the part defining cavity.

Advantageously, due to this separation of the mold portions, the pressurized gas is uniformly distributed throughout the mold cavity and pressed uniformly against the inner surface of the molded part. To respond to the volume increase of the mold cavity 18 created by the separating movement of the mold portion 14, additional gas at the same pressure is introduced into the mold cavity to maintain the desired pressure on the plastic. The annular gas seal rings so formed will cooperate to retain the gas in the mold cavity.

After the high pressure gas has driven the clamping ram 170 to the left by a predetermined distance, the movable platen 164 will engage and "trip" the reed 194 of the limit switch 192. The switch will send a signal to the electronic control 196, which energizes the pressure relief valve 184. Pressurized fluid at a pressure high enough to generate a closing force sufficient to overcome the separating force exerted by gas pressure in the cavity set by the gas valve 190 is then pumped into the fluid chamber 178a. The closing force will act against the piston area 174a to drive the clamping ram and movable mold portion 14 toward the stationary mold portion 16. When this happens, the gas in the part defining mold cavity is compressed and the gas pressure increased.

In some applications, the mold portions will not completely close upon return of the clamping ram but will remain separated by a small amount. A couple of reasons for this is an inability to completely compress the injected gas, and a desire to limit the high forces that necessarily would act on the mold apparatus. If the setting of the pressure regulator 244 is reduced, the mold faces could be clamped (i.e., the molds closed).

In one application, a suitable gas pressure setting of the valve 190 was found to be between 500 and 3,000 psi and preferably about 1,500 psi a suitable separation was found to be approximately 0.001 to 0.005 inch and preferably about 0.003 inch. The higher pressure in the fluid chamber 178a caused by valve 184 resulted in the clamping ram 170 compressing the nitrogen gas in the cavity 18 from about 1,500 psi to about 2,000 psi and the gap to decrease by about 0.0005 inches.

When the molded part has cooled, the mold portions are separated and the part removed. As described above, the gas could be reclaimed first and the molded part then removed, and the gas could be recirculated to provide cooling.

In FIG. 23, a mold apparatus 218, which is similar to the mold apparatus 156, comprises the stationary and movable mold portions 16 and 14 having the above-described mating surfaces and part defining surfaces which form a mold cavity when the molds are closed, the movable mold portion 14 including a gas outlet 30 to supply gas to the mold cavity, the reciprocating clamping ram 170 having one end formed as a piston 174 and the other end fixedly connected to the ram. The piston is disposed for reciprocating movement in a fluid chamber 178 and defines two variable volume chamber portions 178a and 178b. A plurality of tie bars 162 are secured to the stationary platens 158, 160 and 164 to connect the mold apparatus together, and a plastic injection ram is positioned adjacent the stationary mold portion for injecting hot molten thermoplastic into the mold cavity. The platen 164 is fixedly connected to the rod end of the ram and fixedly supports the movable mold portion 14 for movement relative to the stationary mold portion 16.

According to this exemplary embodiment, hydraulic fluid is supplied into each of the two variable volume chamber portions 178a and 178b. In particular, hydraulic fluid is supplied to a desired chamber portion by a four-way hydraulic directional valve 220, having solenoid valves 220a and 220b, via a first fluid line 222 communicating with the chamber portion 178a on the cap side 174a of the piston and via a second fluid line 224 communicating with the chamber portion 178b on the rod side 174b of the piston. Fluid is supplied to the directional valve 220 via an electronically energized hydraulic relief valve 184 in communication with a pump 186 and motor 188.

Axial movement of the clamping ram 170 in a direction away from the stationary mold portion is limited by an electric switch in the form of a linear potentiometer 228 that operates between the movable platen 164 and the stationary platen 160. The potentiometer includes an axial rod 228a that has a stationary end connected to the platen 160 and a "tripping end" that moves relative to an electronic switch 230 mounted on the moving platen. The switch 230 is electrically connected by a wire 232 to the hydraulic relief valve 184 to "trigger" the directional valve 220 after a predetermined axial movement of the platen 164. The valve 220 is energized to supply pressurized hydraulic fluid into the chamber portion 178a via the fluid line 222 whereby to provide a closing force which is high enough to overcome the separating force on the ram and drive the clamping ram in the opposite and mold closing direction.

Pressurized gas to compression form the hot molten mold material is injected into the mold cavity along a path that includes the gas pressure source 38, a hand-operated gas shutoff valve 234, a gas pressure regulator 190, a solenoid operated gas directional valve 236, a one way check valve 238, and the gas inlet line 32 leading to the gas outlet 30 opening into the mold cavity. Pressurized gas can be vented from the mold cavity along a path that includes the gas inlet line 32, a vent line 240 to a second gas directional valve 242, a second gas pressure regulator 244, and through a hand-operated gas flow control valve 246. Further, the pressurized gas can be vented from the mold cavity along a path that includes the gas inlet line 32, a vent line 248, a third gas directional valve 250, and through a hand-operated gas flow control valve 252.

In operation, the gas directional valves 236, 242 and 250 are closed. The fluid pressure in the chamber portion 178a acting on the piston face 174a is increased, whereby a closing force drives the clamping ram to the right, the mold portions together and into their closed position, and the mating surfaces into clamped relation. Hot melted thermoplastic is injected via the screw ram 168 into the mold cavity, thereby forming a molded part. The nozzle shutoff valve 169 is closed after the plastic is introduced so that the plastic cannot be pushed back into injection molding machine.

The gas directional valve 236 is energized, thereby allowing Nitrogen gas from the gas storage chamber 38 to pass through the valve 234, through the gas pressure regulator 190, through the check valve 238 and into the gas inlet line 32 leading to the mold cavity. If desired, a pressure relief valve 256 could be added as a safety precaution to prevent the pressure getting too high. The regulator 190 regulates the gas pressure in the gas supply bottle 38 whereby the gas pressure at the valve 236 is maintained at a value that is lower than the pressure of the gas in the bottle 38.

The pressurized gas in the mold cavity is high enough to develop a separating force on the movable mold cavity surface that is greater than the clamping force acting on the piston face 174a and this separating force pushes the movable mold 14 and platen 164 away from the stationary mold portion 16. Importantly, the forming gas is now distributed uniformly over the entire interior molding face of the molten thermoplastic. Movement of the platen 164 causes the potentiometer rod to extend and the electronic switch 230 to be tripped, whereby to send a signal to the electronically modulated electronic relief valve 184. The valve 184, at a preset pressure, is energized and pressurizes the chamber 178a. This preset pressure develops a force on the piston face 174a which is high enough to overcome the separating force whereby to drive the platen 164 to the right to press the mold portion 14 toward the mold portion 16 and substantially close the mold portions.

If desired, the pressure of the compression gas in the mold cavity can be reduced. The reason for this is that if the mold halves are opened at the high pressure of the gas directional valve 236, the molded part would be blasted out, which could be dangerous. Reducing the mold cavity to a pressure that is lower than the forming pressure allows "ejection" of the part.

In operation, after a preselected time period to allow the part to cool without undergoing shrinkage, the gas directional valve 236 is de-energized (i.e., closed) and the second gas directional valve 242 is energized (i.e., opened). The gas directional valve 250 is also closed. As such, the pressurized gas goes to the second gas pressure regulator 244, which is at a pressure lower than that of the gas pressure regulator 190.

Additionally, if desired, the mold cavity can be unpressurized following the molding. In such approach, the second gas directional valve 242 is de-energized (i.e., closed), and the gas directional valve 250 is energized (i.e., opened), whereby gas decays through the gas flow control valve 252 and vents to atmosphere.

Additionally, if desired, the clamping ram 170 can be hydraulically forced. In such operation, the solenoid valve 220a is energized whereby the chamber portion 178a is pressurized by fluid via path 222, fluid returns from chamber portion 178b via path 224, and the mold portions 14 and 16 are brought into clamped relationship. Thereafter, hot flowable plastic is injected into the mold cavity, and the nozzle shutoff valve 169 closed. The solenoid valve 220a is then de-energized and solenoid valve 220b is energized. As such, pressurized fluid passes via path 224 into the chamber portion 178b and from the chamber portion 178a via path 222, thereby forcing the piston 174 to the left and pulling the platen 164 and mold portion 14 away from the stationary mold portion 16, until such point that the platen 164 and potentiometer rod "trip" the switch 230. At this point, solenoid 220b is de-energized and valve 236 is energized, which causes gas on one side of the mold part to push the molding material to other side of the molding. The pressure is held for a short period of time. Thereafter, solenoid 220a is energized thereby forcing the clamping ram and mold portion 14 against the mold portion 16.

The arrangement shown in FIG. 23 advantageously allows control over molding pressure, intensification pressure, ejection pressure and zero pressure.

Although in the preferred embodiment the plastic is sufficient to fill between 90 and 99.5% of the cavity but not completely pack out the cavity, under special circumstances it has been found desirable to completely pack the mold. In particular, according to another preferred embodiment of the invention, the piston/cylinder would be pressurized to close the mold and hold the mold portions together with a predetermined clamping force and the molten plastic then injected into and between opposite walls of the article defining cavity in an amount to completely pack the cavity. The cylinder would then be pressurized to cause the clamping ram 170 to separate the mold portions by a predetermined amount and thereby increase the volume of the mold cavity. As such, the plastic now would not completely pack the cavity. Then, as before, a charge of pressurized gas would be introduced into the cavity to form a gas cushion against one wall of the cavity that forces the molten plastic against the other wall of the cavity and the pressure maintained for a sufficient time for the plastic to set up. The mold portions would then be forced towards one another and the pressure of gas in the cavity compressed and increased to a higher pressure. Depending on the application, the mating faces could be driven into abutment or positioned in spaced relation.

While the above-description constitutes the preferred embodiment of the invention, it will be appreciated that the invention is susceptible to modification, variation, and change without departing from the proper scope or fair meaning of the accompanying claims.

What is claimed is:

1. In a method of producing a solid injection molded part having no internal voids and a sink-free exterior, the steps of the method comprising attaching a mold apparatus having a part defining cavity formed by a stationary mold portion and a movable portion to a source of hot flowable thermoplastic and to a source of gas under pressure, clamping the mating faces of said mold portions together with a predetermined clamping force, injecting a predetermined quantity of said thermoplastic into said mold cavity, said predetermined quantity of thermoplastic being of a lesser volume than the volume of said mold cavity, introducing said gas into said mold cavity while said thermoplastic is still flowable whereby to pressurize said mold cavity and force said thermoplastic away from one of said mold portions and towards the other of said mold portions, the improvement comprising:

introducing said gas at a first pressure which is sufficient to produce a separating force on the movable portion that is greater than said clamping force whereby to force the movable mold portion from clamped relation with the stationary mold portion and increase the volume of the mold cavity, said mold separation allowing the gas to be uniformly distributed throughout the mold cavity and against the thermoplastic, continuing to introduce said pressurized gas at said first pressure and force the mold portions further apart, terminating the introduction of pressurized gas when the movable mold portion has been forced from the stationary mold portion by a predetermined distance, and increasing said clamping force to a level that is greater than said separating force whereby to overcome the separating force and drive the mold portions towards one another.

2. The method as claimed in claim 1 wherein said forcing of the mold portions together compresses said gas in the mold cavity and increases the pressure of the gas acting on said molten thermoplastic.

3. The method as claimed in claim 1 wherein the predetermined quantity of thermoplastic is sufficient to substantially fill but not pack out the mold cavity.

4. The method as claimed in claim 3 wherein the predetermined quantity of thermoplastic is sufficient to fill between 90–99.5% of the mold cavity.

5. The method as claimed in claim 1 wherein said driving together of said mold portions includes forcing the mating faces of said mold portions together.

6. The method as claimed in claim 1 wherein said driving together of the mold portions includes forcing the mating faces of said mold portions together but so as to be positioned in spaced-apart relation from with one another.

7. The method as claimed in claim 1 wherein the increased clamping force is sufficient to compress the gas in said cavity but insufficient to force the mating faces together.

8. The method as claimed in claim 1 wherein said clamping step includes connecting first and second end portions of a reciprocating clamping ram to said movable mold portion and to a pressurizable fluid chamber, and pressurizing said fluid chamber whereby to produce a force on said second end portion sufficient to drive said first end portion and said movable mold portion connected thereto towards said stationary mold portion.

9. The method as claimed in claim 8 wherein said second end portion defines a reciprocating piston which divides said fluid chamber into two variable volume chamber portions, and said pressurizing step increases the pressure in only one of said chamber portions.

10. The method as claimed in claim 1 including providing a gas inlet in one of said mold portions, and forming a continuous annular recess in said one mold portion and between said gas inlet and said mating faces, wherein said injecting step comprises filling said annular recess with said thermoplastic whereby to form a seal ring of sufficient depth that the predetermined separation of said mold portions will not allow gas escape from the mold cavity.

11. The method as claimed in claim 6 wherein said first pressure is between 500 and 3,000 psi and said separation is between 0.001 to 0.005 inches.

12. The method as claimed in claim 11 wherein said first pressure is about 1,500 psi and said separation is about 0.003 inches.

13. The method as claimed in claim 12 wherein the gas in said cavity is compressed to about 2,000 psi and the separation between said mating faces about 0.0005 inches.

14. The method as claimed in claim 6, including venting part of the gas from said mold cavity following said driving step whereby to reduce the gas pressure in the cavity, separating the mold portions, and using the remaining pressurized gas to remove the finished part.

15. The method as claimed in claim 8 wherein said pressurizing step follows said gas introducing step and includes substantially simultaneously decreasing the pressure in said second chamber portion while increasing the pressure in said first chamber portion and thereby increasing said clamping force to a level that is greater than said separating force.

16. The method as claimed in claim 8 wherein said second end portion defines a reciprocating piston which divides said fluid chamber into first and second fluid chamber portions, and the steps include, in sequence, substantially simultaneously increasing and decreasing the pressures in the first and second chamber portions, respectively, and causing the piston to drive the movable mold portion into clamped relation with the stationary mold portion, injecting the molten thermoplastic into the mold cavity, substantially simultaneously decreasing and increasing the pressures in the first and second chamber portions, respectively, and causing the mold portions to separate from one another by the predetermined distance, introducing and continuing to introduce pressurized gas into the mold cavity to drive the thermoplastic against the mold walls, and increasing and decreasing the pressures in the first and second chamber portions, respectively, and causing the movable mold portion to move towards the stationary mold portion whereby to compress the gas in the mold cavity.

17. A method of producing a solid injection molded part having no internal voids and a sink-free exterior, the steps of the method comprising:
- attaching a mold having a part defining cavity formed by a fixed portion and a movable portion to an injection molding machine including the step of attaching at least one gas pressure line to said mold,
- clamping the respective mating faces of mold portions together whereby to close the mold,
- injecting a predetermined quantity of hot flowable thermoplastic into the mold cavity in an amount to substantially pack said mold cavity,
- separating the mating faces and the mold portions from clamped relation to increase the volume of the mold cavity such that the thermoplastic no longer packs said mold cavity,
- introducing pressurized gas into the increased volume mold cavity through said pressure line while said thermoplastic is fluid whereby to completely fill the mold cavity under a predetermined pressure and without creating a void in the thermoplastic, said gas forcing said thermoplastic away from said pressure line,
- driving said mold portions towards one another whereby to increase the pressure of the gas in said mold cavity acting on said thermoplastic,
- cooling the thermoplastic in said cavity, and
- ejecting the part from the mold.

18. The method as claimed in claim 17 wherein said separating step causes the mating faces to be separated by a predetermined amount that is insufficient to permit the escape of thermoplastic between the mating faces.

19. The method as claimed in claim 17 wherein said mating faces define a mating plane and form a parting line of the mated mold portions, and the step of introducing pressurized gas includes forcing a portion of said thermoplastic against the parting line thereby forming an uninterrupted gas seal ring around said parting line, said seal ring being formed by portions extending above and below the mating plane.

20. The method as claimed in claim 17 wherein said driving step includes causing said mating faces to be abutted.

21. The method as claimed in claim 17 wherein said driving step includes causing said mating faces to be separated during compression of the gas.

22. A method of producing a solid, gas compression, injection molded thermoplastic part, comprising:
- attaching the first and second opposite ends of a clamping ram, respectively, to one mold portion of a pair of relatively movable mold portions and to a pressurizable fluid chamber, the mold portions having mating faces and respective part defining surfaces,
- forcing the clamping ram in a first direction and the mating faces together whereby the respective part defining surfaces of the mold portions form a part defining mold cavity,
- introducing hot flowable thermoplastic into said mold cavity in an amount less than that needed to completely fill the cavity,
- holding the thermoplastic for a time period sufficient for the thermoplastic to form but not cool,
- substantially simultaneously, introducing pressurized gas at a first pressure into said mold cavity whereby to form a gas cavity which forces the thermoplastic away from one and towards the other part defining surface and separating the mold portions whereby to increase the volume of said gas cavity and allow said gas to be distributed uniformly therewithin and behind the thermoplastic, said gas cavity being filled by gas introduced at said first pressure and said mold portions being separated by an amount insufficient for thermoplastic to pass between said mating faces,
- forcing the mold portions towards one another such that the mold portions are positioned in separated relation to one another, said forcing together of the mold portions compressing the gas in said cavity to a second pressure which is higher than said first pressure,
- cooling the thermoplastic at said second pressure to form said thermoplastic part, and
- venting the gas from said cavity heated by contact with said plastic.

23. In a thermoplastic injection molding process of the type in which hot molten thermoplastic is injected into a mold cavity defined by a pair of relatively movable mold parts, gas is injected into the cavity to displace the thermoplastic in the mold cavity to form a part having no internal voids, means are provided to selectively control the pressure of the gas in the mold cavity, and the resin cools and the mold is opened to remove the molded part, the gas being stored at a storage first pressure as determined by the control means, and the gas at said storage first pressure being reduced to a lower storage second pressure as determined by said control means and the gas introduced into the mold cavity at said lower second pressure to displace the thermoplastic in the mold cavity, the improvement wherein following the injection of gas into the mold at said lower second pressure the mold parts are moved relative to one another to increase the volume of the mold cavity and additional gas at said second pressure is continuously introduced into the mold cavity to completely fill the cavity, and thereafter the gas at said second pressure is increased to a third pressure greater than said second pressure as determined by said control means.

24. The method as claimed in claim 23 including the step of terminating the introduction of gas at said second pressure when the mating faces of the mold parts have separated by a predetermined amount insufficient to remove the mold part from the mold cavity or for plastic to escape from the mold cavity via the mating faces, and holding said second pressure for a predetermined time whereby to allow the gas to evenly distribute throughout the mold cavity.

25. The method as claimed in claim 24 wherein said predetermined time is between 10 to 15 seconds.

26. The method as claimed in claim 23 including connecting a drive ram to one of said mold parts, said drive ram having a piston part having a working face disposed in a pressurizable chamber and an outer rod part connected to said movable mold part for driving said movable mold part to a first position in which said mold parts are clamped together and to a second position in which the mold parts are spaced apart, and the step of increasing the gas pressure to said third pressure includes sensing movement of the movable mold part due to said second pressure and sending a signal to said control means, said control means pressurizing said chamber to a level sufficient to drive said clamping ram and said movable mold part towards the other mold part whereby to increase the mold cavity pressure to said third pressure, thereby constantly urging the plastic material away from one mold part and against the cavity walls of the second mold part.

27. A method for the use of gas in molding a solid plastic article in an injection molding system including combinable mold portions which when combined cooperate to form an article defining cavity, the method comprises the steps of:
   closing the mold portions and holding the mold portions together with a predetermined clamping force,
   injecting a predetermined amount of molten plastic resin into the cavity in an amount sufficient for the preparation of the plastic article,
   separating the mold portions to increase the volume of the article defining cavity,
   injecting a charge of pressurized gas into the cavity from one side of the cavity to force the molten plastic resin against the other side of the cavity,
   maintaining the level of the pressure of the gas charge within the cavity until the plastic has set up in the cavity to form the article,
   compressing the gas charge in the mold cavity to a higher pressure for a predetermined period of time,
   relieving the gas pressure within the cavity, and removing the article from the mold,
   said gas injecting step following said resin injecting step and immediately preceding the step of separating said mold portions whereby to form a gas cushion against one side of the resin and the other wall of the cavity and develop a separating force which is greater than said clamping force,
   said separating force operating to force the mod portions apart, and
   the separation of said mold portions following the gas injecting step thereby allowing the gas to be disturbed substantially instantaneously throughout the cavity and uniformly against one side of the resin.

28. The method as claimed in claim 27 wherein said separating step includes continuously injecting pressurized gas into the cavity during separation of the mold portions.

29. The method as claimed in claim 27 wherein said gas injecting step follows the step of separating said mold portions, and said pressurizing step includes attaching the actuation rod end of a piston-rod assembly to one of said mold portions, the piston being mounted for movement in and dividing a pressurizable cylinder into two chamber portions, and selectively pressurizing the chamber portions to move said one mold portion away from or towards the other of said mold portions.

30. A method for the use of gas in molding a solid plastic article in an injection molding system including combinable mold portions which when combined cooperate to form an article defining cavity having opposite cavity walls, the method comprising the steps of:
   closing the mold portions and holding the mold portions together with a predetermined clamping force,
   injecting molten plastic resin into the cavity in an amount sufficient to completely pack the cavity,
   separating the mold portions to increase the volume of the article defining cavity, said separation resulting in the molten plastic resin being less than the total amount of plastic to completely pack the cavity,
   injecting a charge of pressurized gas into the cavity, said gas charge being of sufficient pressure and quantity to form a gas cushion against one wall of the cavity that forces the molten plastic against the other wall of the cavity, and
   forcing the mold portions towards one another whereby to compress the gas in the article defining cavity to a higher pressure.

31. The method as claimed in claim 30 further including the steps of maintaining the level of the pressure in the cavity immediately following the gas injecting step until the plastic has set up in the cavity and immediately following the mold forcing step.

32. The method as claimed in claim 31 including immediately following the step of forcing the mold portions together the steps of relieving the gas pressure within the cavity, and removing the article from the mold.

33. The method as claimed in claim 32 wherein the step of forcing the mold portions together includes abutting the mating faces of the mold portions.

34. The method as claimed in claim 39 wherein the step of forcing the mold portions together includes maintaining the mating faces of the mold portions in spaced apart relation.

35. In an injection molding process for producing a solid injection molded part having no internal voids and a sink free exterior, the process including introducing a predetermined quantity of thermoplastic resin into a mold forming cavity formed by a pair of relatively movable mold portions each having a mold surface and clamping the mold portions together with a predetermined clamping force, the improvement comprising, introducing gas under pressure to pack the resin against one mold surface and away from the other mold surface and to produce a separating force greater than the mold clamping force to force the molds apart, and thereafter increasing the clamping force to drive the molds toward one another.

36. In an injection molding process for producing a solid injection molded part having no internal voids and a sink free exterior, the process including introducing a predetermined quantity of molten thermoplastic resin into an article defining cavity formed by a pair of relatively movable mold portions each having a mold surface and clamping the mold portions together with a predetermined clamping force, the improvement comprising introducing gas under pressure into the cavity to pack the resin against one mold surface and force the resin away from the other mold surface to form a solid article and to simultaneously force the mold portions away from one another, and then forcing the mold portions towards one another to compress the gas to a second pressure.

37. In an injection molding process for producing a solid injection molded article having no internal voids and a sink free exterior, the process including introducing a predetermining quantity of thermoplastic resin into a mold forming cavity formed by a pair of relatively movable mold portions and in an amount to pack the mold cavity, the mold portions each having a mold surface, clamping the mold portions together with a predetermined clamping force, and introducing gas into the cavity to pack the resin against one mold surface and away from the other mold surface to form the solid article, the improvement comprising separating the molds following the resin introduction step and prior to the gas introduction step, preforming the gas introduction step and then forcing the molds towards one another to compress the gas.

* * * * *

UNITED STATES PATENT AND TRADEMARK OFFICE
CERTIFICATE OF CORRECTION

PATENT NO. : 5,344,596

DATED : Sept. 6, 1994

INVENTOR(S) : James W. Hendry

It is certified that error appears in the above-indentified patent and that said Letters Patent is hereby corrected as shown below:

On title page, Abstract, Line 20, "reclosed" should be --reclose--;

Col. 3, Line 13, "lesser" should be --less--;

Col. 8, Line 31, "show" should be --shows--;

Col. 11, Line 19, after "would" insert --be--;

Col. 12, Line 24, "preferable" should be --preferably--;

Col. 16, Line 19, "psi" should be --psi;--;

UNITED STATES PATENT AND TRADEMARK OFFICE
CERTIFICATE OF CORRECTION

PATENT NO. : 5,344,596
DATED : Sept. 6, 1994
INVENTOR(S) : James W. Hendry

It is certified that error appears in the above-indentified patent and that said Letters Patent is hereby corrected as shown below:

Col 18, Line 40, insert "the" before --other--;

Col. 19, Line 65, Claim 6, delete --from--;

Col. 23, Line 32, Claim 27, "mod" should be --mold--;

Col. 23, Line 35-36, Claim 27, "disturbed" should be --distributed--;

Col. 24, Line 19, Claim 34, "Claim 39" should be --Claim 32;

Col. 24, Line 65, Claim 37, "preforming" should be --performing--.

Signed and Sealed this

Twenty-third Day of May, 1995

Attest:

BRUCE LEHMAN

*Attesting Officer*   *Commissioner of Patents and Trademarks*